United States Patent
Myers et al.

(10) Patent No.: US 6,869,151 B2
(45) Date of Patent: Mar. 22, 2005

(54) KNUCKLE-SUPPORTED WHEELEND ASSEMBLY WITH IMPROVED SHAFT-HUB INTERFACE

(75) Inventors: Douglas C. Myers, Canton, MI (US); Hui Hugh Wang, Ann Arbor, MI (US); Karl-Heinz Simons, Merzenich (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/431,213

(22) Filed: May 7, 2003

(65) Prior Publication Data

US 2004/0222694 A1 Nov. 11, 2004

(51) Int. Cl.$^7$ ............................ B60B 27/00; B60B 35/00
(52) U.S. Cl. .................. 301/126; 301/6.8; 301/111.02; 301/131; 188/18 A; 279/138; 403/359.2
(58) Field of Search ................... 301/6.1, 6.8, 105.1, 301/126, 131, 111.02; 188/18 A, 218 XL; 403/359.1, 359.2, 359.6; 279/138

(56) References Cited

U.S. PATENT DOCUMENTS

| | | | |
|---|---|---|---|
| 1,241,743 A | | 9/1917 | Altman |
| 1,790,737 A | | 2/1931 | Alborn |
| 1,984,169 A | | 12/1934 | Wyant et al. |
| 2,681,805 A | * | 6/1954 | Parker et al. ............... 279/138 |
| 2,803,159 A | * | 8/1957 | Hohwart et al. ............. 82/168 |
| 2,890,054 A | * | 6/1959 | Better ........................ 279/138 |
| 4,429,767 A | | 2/1984 | Jenkins |
| 5,100,247 A | * | 3/1992 | Woehler ..................... 384/544 |
| 5,772,285 A | | 6/1998 | Bigley et al. |
| 5,794,713 A | | 8/1998 | Berscheid |
| 5,988,324 A | | 11/1999 | Bertetti et al. |
| 6,095,617 A | | 8/2000 | Bertetti |
| 6,109,411 A | | 8/2000 | Bigley |
| 6,170,628 B1 | | 1/2001 | Bigley |
| 6,196,639 B1 | | 3/2001 | DiPonio et al. |
| 2001/0026095 A1 | | 10/2001 | DiPonio et al. |
| 2002/0168222 A1 | * | 11/2002 | Simons et al. ........... 403/359.1 |

FOREIGN PATENT DOCUMENTS

JP          58-211020          * 12/1983

* cited by examiner

Primary Examiner—Russell D. Stormer
(74) Attorney, Agent, or Firm—Brinks Hofer Gilson & Lione

(57) ABSTRACT

A knuckle-supported wheelend assembly includes a shaft having a contoured peripheral surface portion proximate to an outboard end featuring a minimum radius and a maximum radius, and a hub mounted on the shaft's contoured surface portion via a complementary, contoured central bore. The nontapered contoured hub-shaft interface includes a slight twist or jog to reduce backlash and to permit a relative shortening of the length of axial hub-shaft engagement to as little as about 45% of the maximum radius, thereby advantageously reducing scrub radius for a given wheel-tire combination. By eliminating any required taper of the contoured interface, the hub's inboard face firmly abuts the machined face of the inner race of a knuckle-mounted, shaft-supporting bearing assembly to achieve reduced assembly runout. The hub's wheel-mounting face and integral annular friction surfaces are each machined with reference to the inboard hub face to ensure a high degree of parallelism.

14 Claims, 2 Drawing Sheets

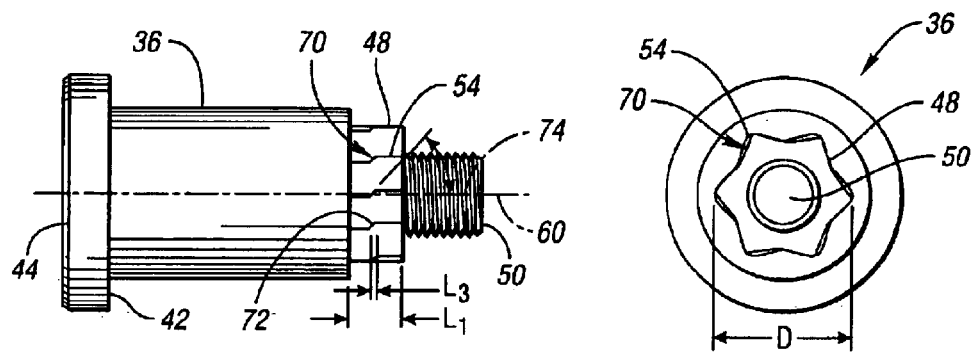
*Fig. 2*  *Fig. 3*
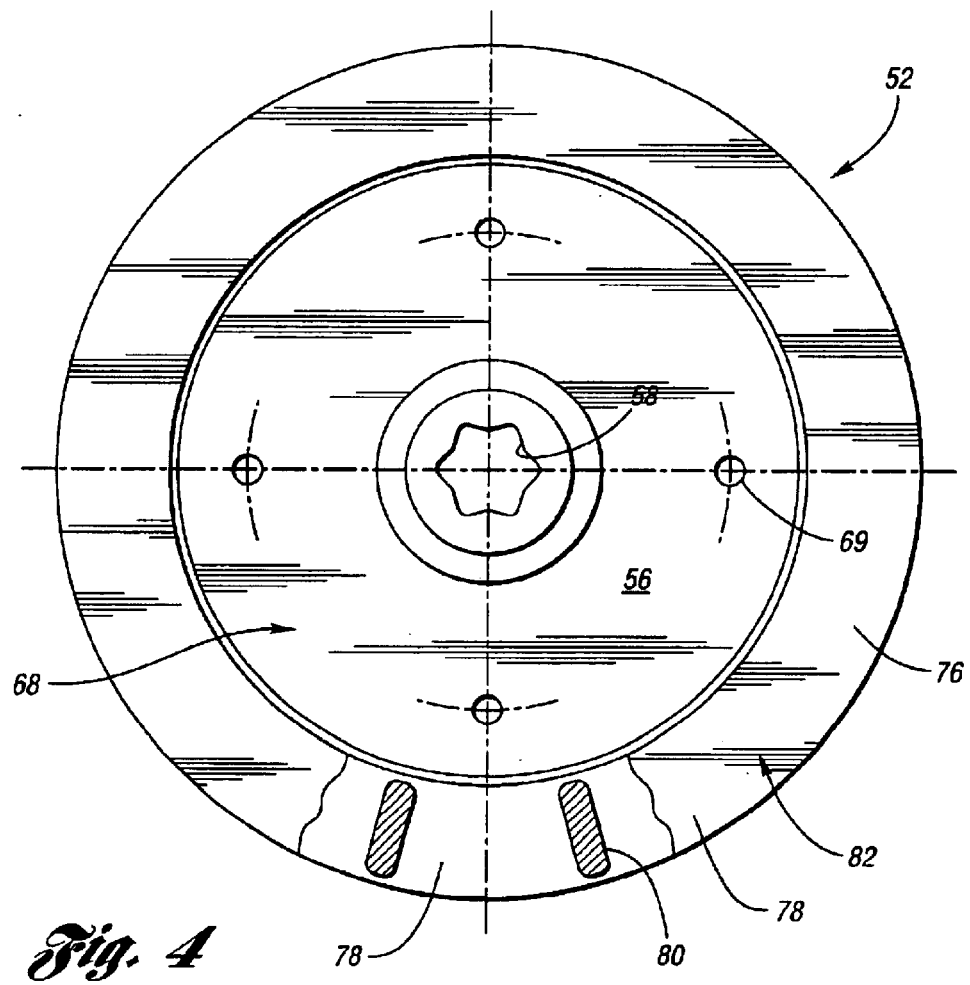
*Fig. 4*

KNUCKLE-SUPPORTED WHEELEND ASSEMBLY WITH IMPROVED SHAFT-HUB INTERFACE

FIELD OF INVENTION

The invention relates to corner modules for motor vehicles that feature a half shaft or stub shaft that is supported for rotation within a bore of a knuckle.

BACKGROUND OF THE INVENTION

The prior art teaches front-end corner modules for motor vehicles in which a knuckle is attached to a vehicle chassis as by several links, such that the knuckle is pivoted relative to the chassis by a steering rod coupling the knuckle to the vehicle's steering system. Typically, a bearing on the knuckle supports a half shaft or stub shaft for relative rotation. The shaft, in turn, supports a wheelend assembly that typically includes a wheel hub mounted on the shaft, a rotor having a center portion mounted on the wheel hub, and a wheel and tire combination mounted on the wheel hub as by a plurality of lug bolts.

In order to facilitate repair and replacement of the wheelend's several components, the wheel hub is typically removably mounted on a splined section of the shaft and axially secured by a nut threadably mounted on the threaded outboard end of the shaft. The splined section of the shaft is typically formed by rolling the spine in the end of the shaft and then heat treating the rolled spline for strength and toughness. A slight helix or twist is often added to the spline along its entire length to minimize backlash upon tightening of the nut to secure the wheel hub on the outboard end of the shaft.

Unfortunately, the post-rolling heat treatment of the shaft introduces dimensional variations in the splined portion of the shaft. To accommodate tolerance accumulation, the prior art has resorted to use of relatively longer lengths of splined engagement between the wheel hub and the shaft. Such increased axial length of engagement between wheel hub and shaft, in turn, generates a larger scrub radius, for a given wheel-and-tire combination having a fixed offset. Moreover, the tolerance variations in the splined portion of the shaft combine with hub, rotor, and bearing tolerance stack-ups to increase run-out, particularly as to the friction ring of the brake rotor, and to reduced shaft-wheel hub concentricity, thereby limiting possible improvements to vehicle Noise, Vibration and Harshness (NVH) levels.

Alternatively, U.S. Pat. No. 6,450,585 teaches a wheelend assembly featuring a polygonal shaft-wheel hub interface, wherein the helical spline is replaced by a tapered end portion of the shaft featuring a polygonal outer contour defining a plurality of machined lobes. By using a taper to provide a slightly conical construction of the polygonal outer contour, the '585 patent teaches that a shaft-hub interface is achieved which is free of play in both the axial and radial directions.

However, as in the case with known splined interfaces, the tapered polygonal shaft-wheel hub interface requires a significantly increased length of axial engagement of the shaft-wheel hub interface, exceeding perhaps 65% or more of the maximum diameter of a given lobe, particularly as the number of lobes is reduced to a number approaching a minimum number of three lobes. This increased length of axial engagement of the shaft-wheel hub interface, in turn, tends to increase scrub radius or kingpin offset for a given wheel-tire combination used with the wheelend assembly, thereby limiting design and packaging flexibility when using such a shaft-hub interface. Moreover, the increased-axial-length, tapered shaft-wheel hub interface requires particularly tight tolerances in order to ensure that the inboard face of the wheel hub can still be suitably biased against the bearing's inner race by a threaded fastener on the outboard end of the shaft, with an attendant increase in manufacturing costs, in order to avoid an unintended increase in wheel hub runout.

Accordingly, what is needed is an improved wheelend assembly featuring a shaft-wheel hub interface that overcomes the aforesaid deficiencies of the prior art.

SUMMARY OF THE INVENTION

Under the invention, a wheelend assembly is provided for use in a corner module of a motor vehicle that includes a knuckle having a bore adapted to receive and support the wheelend assembly. The wheelend assembly includes an elongate shaft having a contoured peripheral surface portion proximate to the shaft's outboard end. The contoured peripheral surface portion of the shaft includes at least three crests when viewed in lateral cross-section, more preferably, an even number of crests to enhance manufacturability. Each crest has a maximum crest diameter that remains substantially constant over a first length of the shaft. In this regard, it is noted that, where the contoured peripheral surface portion has an odd number of crests, the crest will be deemed to have an effective maximum crest diameter equal to twice the maximum crest radius of a given crest.

The wheelend assembly further includes a bearing assembly supporting the shaft for rotation in the bore of the knuckle, wherein the bearing assembly includes an inner race having a bearing face generally normal to the longitudinal axis of the shaft. The wheelend assembly further includes a wheel hub mounted on the shaft proximate to the shaft's outboard end. Specifically, the wheel hub includes an outboard wheel-mounting face and an inboard face, the inboard face of the hub directly abutting the bearing face. The wheel hub further includes a central portion with a central bore adapted to matingly receive the contoured peripheral surface portion of the shaft such that the hub rotates with the shaft, with the wheel hub's central bore engaging the shaft's contoured peripheral surface portion along a second length of the shaft within the first length of the shaft.

In accordance with an aspect of the invention, the second length of the shaft, along which the wheel hub's central bore engages the shaft's contoured peripheral surface portion, is no greater than about 60% of the maximum crest diameter. More preferably, the second length of the shaft is no greater than about 50% of the maximum crest diameter. And, most preferably, the second length of the shaft is no greater than about 45% of the maximum crest diameter.

In accordance with another aspect of the invention, each crest defined by the contoured peripheral surface portion of the shaft includes a circumferential jog along a third length of the shaft, within the second length of the shaft engaged by the wheel hub's central bore. The jog significantly reduces backlash while otherwise permitting the wheel hub to be appropriately biased against the bearing face of the bearing assembly, whereby wheel hub runout is significantly reduced. Preferably, the jog's third length is no greater than about 30% of the second length of the shaft. A portion of each crest, along the third length of the shaft, preferably defines a line disposed at a predetermined angle with respect to a plane intersecting the longitudinal axis of the shaft.

While the invention contemplates a range of suitable angles, the predetermined angle is preferably no greater than about 0.6°.

Thus, under the invention, a wheelend assembly is provided that advantageously features a shaft-wheel hub interface exhibiting greater concentricity to thereby reduce wheelend vibrations while further providing reduced runout for both the wheel hub and the friction surfaces of the hub's integrated rotor portion, whereby vehicle NVH levels are significantly improved.

Further, the significantly-reduced axial dimension of the shaft-wheel hub interface under the invention advantageously provides a reduced scrub radius or kingpin offset for a given wheel-tire combination mounted on the wheel hub, with an attendant increase in design and packaging flexibility.

Additional features, benefits, and advantages of the invention will become apparent to those skilled in the art to which the invention relates from the subsequent description of several exemplary embodiments and the appended claims, taken in conjunction with the accompanying Drawings.

BRIEF DESCRIPTION OF THE DRAWINGS

In the Drawings, wherein like reference numerals are used to designate like components in each of the several views, and wherein the relative thickness of certain components has been increased for clarity of illustration:

FIG. 2 is an elevation of the stub shaft of the exemplary wheelend assembly;

FIG. 3 is an end view of the stub shaft showing the contoured peripheral surface portion that defines a generally polygonal shape having six circumferentially-spaced "crests," with each crest further including a slight circumferential "jog" to reduce backlash in accordance with another aspect of the invention; and FIG. 4 is an end view of the wheel hub, partially broken away to show its integral ventilated friction rings.

DETAILED DESCRIPTION OF THE PREFERRED EMBODIMENT

Figure 1:
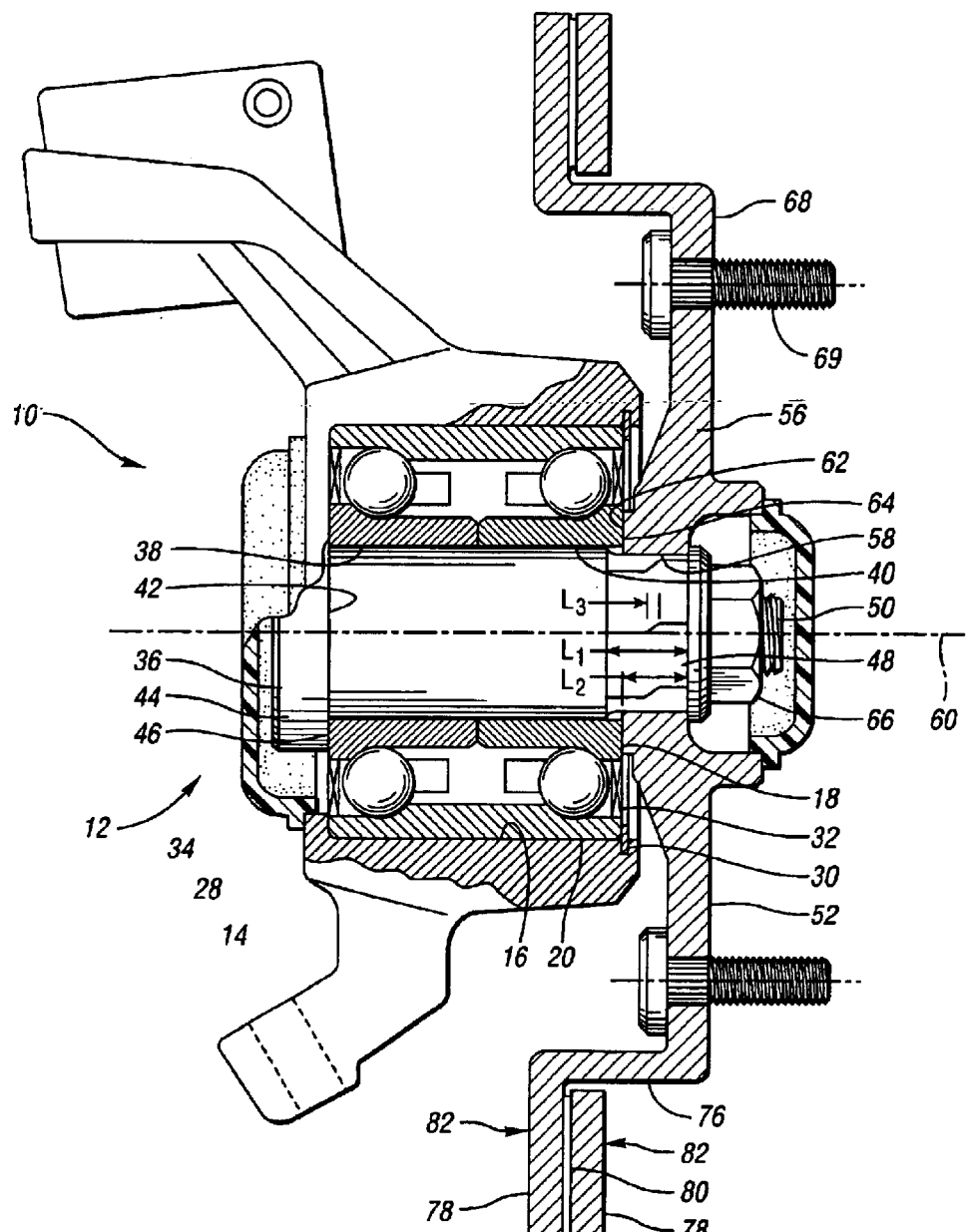
FIG. 1 is a longitudinal view, in partial cross-section, of a vehicle's front-end corner module incorporating an exemplary wheelend assembly in accordance with the invention.

FIG. 1 shows, in partial longitudinal section, an exemplary front-end corner module 10 for a motor vehicle incorporating a wheelend assembly 12 in accordance with the invention. The illustrated corner module 10 includes a knuckle 14 having a bore 16 within which to receive and support the wheelend assembly 12 for pivoting movement relative to the vehicle's chassis (not shown). It will be appreciated that, under the invention, the term "knuckle" is intended to broadly encompass any structure by which to support the corner module's wheelend assembly 12, including any suitable casting or forging that includes a bore within which to journal a suitable wheelend-supporting shaft. While the wheelend assembly 12 of the illustrated corner module 10 is of the nondriven type, it will be appreciated that myriad aspects of the invention apply equally to driven wheelend assemblies.

As seen in FIG. 1, the illustrated corner module 10 is a "first generation" or "Gen I" design wherein a cartridge-type bearing assembly 18 is press-fit into the bore 16 of the steering knuckle 14 such that the outer race 20 of the bearing assembly 18 is nonrotatably received and supported within the knuckle bore 16. However, It will be appreciated that the wheelend assembly 12 of the invention may equally be employed in subsequent corner-module design "generations," including without limitation, "Gen II," and "Gen II.5" designs featuring, for example, either a different manner of attaching the bearing assembly 18 to the knuckle 14, or integration of bearing assembly races with either the knuckle 14 or the bearing-supported wheelend assembly 12.

Referring again to FIG. 1, in a manner typical of known "Gen I" designs, the inboard face 24 of the bearing assembly's inboard outer race 20 is seated against a shoulder 28 defined in the knuckle bore 16, while a retainer 30 received within a complementary groove 32 of the knuckle bore 16 retains the bearing assembly's outboard outer race 20. The exemplary wheelend assembly 12 includes an elongate stub shaft 36 journalled within the bearing assembly's inboard and outboard inner races 38,40. A radial flange 42 defined on the shaft 36 proximate to the shaft's inboard end 44 abuts and axially bears against the machined inboard face 46 of the bearing's inboard inner race 38.

In accordance with an aspect of the invention, as best seen in FIGS. 2–4, the shaft 36 includes a contoured peripheral surface portion 48 proximate to its outboard end 50, by which to transmit torque to a shaft-mounted wheel hub 52. In the exemplary wheelend assembly 12, the contoured peripheral surface portion 48 is polygonal when viewed in lateral cross-section, defining six circumferentially-spaced "crests" 54. Each crest 54 is characterized by a maximum crest diameter D that remains substantially constant over a first length $L_1$ of the shaft 36.

In accordance with an aspect of the invention, the contoured peripheral surface portion 48 is defined on the shaft 36 as by hard-cutting the surface portion 48 after the shaft 36 has been surface-treated. By way of example only, in a constructed embodiment, the contoured peripheral surface portion 48 is machined in the surface-treated shaft using a dual-cutter method as described in European Patent EP 0 907 458 B1. In this manner, the invention achieves a surface finish on the contoured peripheral surface portion 48 of the shaft 36 that significantly exceeds the tolerances of known rolled-then-heat-treated splined surface portions.

Referring again to FIGS. 1 and 4, the wheel hub 52 of the exemplary wheelend assembly 12 includes a center portion 56 having a central bore 58 adapted to matingly receive the contoured peripheral surface portion 48 of the shaft 36, such that the mounted hub 52 rotates with the shaft 36 about a shaft axis 60. In accordance with an aspect of the invention, as illustrated in FIG. 1, the wheel hub's central bore 58 engages the shaft's contoured peripheral surface portion 48 along a second length $L_2$ of the shaft 36, within the shaft's first length $L_1$. Preferably, the second length $L_2$ of wheel hub engagement with the contoured peripheral surface portion 48 of the shaft 36 is no greater than about 60% of the maximum crest diameter D. More preferably, the second length $L_2$ of the shaft 36 is no greater than about 50% of the maximum crest diameter D. And, most preferably, the second length $L_2$ of the shaft 36 is no greater than about 45% of the maximum crest diameter.

In accordance with another aspect of the invention, an inboard, axial face 62 of the hub's center portion 56 directly abuts the machined outboard face 64 of the bearing assembly's outboard inner race 40, directly reducing observed wheelend runout. The outboard end 50 of the shaft 36 is threaded to receive a nut 66, whereby the hub 52 is axially biased towards the shaft's inboard flange 42 to thereby axially preload the bearing assembly 20 and ensure that the hub's center portion 56 firmly abuts the bearing assembly's machined outboard face 64. The hub's center portion 56 has an annular mounting face 68 that includes a set of circumferentially-spaced bores adapted to receive wheel-mounting lug bolts 69, it will be appreciated that the invention is readily adapted to employ other known manners of securing a wheel (not shown) to the mounting face 68 of the hub 52.

In accordance with yet another aspect of the invention, as best seen in FIGS. 2 and 3, each crest 54 of the contoured peripheral surface portion 48 of the shaft 36 includes a circumferential jog 66 along a third length $L_3$ of the shaft, within the second length $L_2$ of the shaft engaged by the wheel hub's central bore 58. The jog 70 significantly reduces backlash while otherwise permitting the wheel hub 52 to be appropriately biased against the bearing assembly's machined outboard face 64, whereby wheel hub runout is significantly reduced. Preferably, the jog's third length $L_3$ is no greater than about 30% of the second length of the shaft 36. A portion of each crest 54, along the third length $L_3$ of the shaft 36, preferably defines a line 72 disposed at a predetermined angle α with respect to a plane 74 intersecting the longitudinal axis 60 of the shaft 36. While the invention contemplates a range of suitable angles, the predetermined angle α is preferably no greater than about 0.6°. It will be appreciated, however, that the invention contemplates the use of "jogs" that generate other shapes when a given crest 54 is viewed in elevation, including one or more arcs (not shown).

In accordance with another aspect of the invention, the hub 52 includes an integral rotor portion 76 encircling the hub's center portion 56. By way of example, as seen in FIGS. 1 and 4, in the exemplary wheelend assembly 10, the hub 52 is a single, monolithic casting formed, for example, of a nodular or ductile cast iron so as to define both the center portion 56 and the rotor portion 76. While any suitable material or surface treatment may be used, in the exemplary wheelend 10, the center portion of the hub 52 is preferably subjected to an austempering heat-treatment after the hub 52 is cast to thereby obtain austempered ductile iron (ADI) in the center portion 56 while leaving the rotor portion 76 as ductile cast iron. In this manner, the center portion 56 is provided an improved strength and fatigue resistance while the rotor portion 76 retains the as-cast characteristics of the material.

As illustrated in partial breakaway in FIG. 4, the rotor portion 76 of the hub 52 includes a pair of parallel-spaced friction rings 78 separated by a webbing of integrally-formed, radially-extending vanes 80. However, it will be appreciated that the invention contemplates use of either a single, solid, integrally-formed friction ring, or an assembly that includes friction rings mounted on the hub's periphery, for example, as taught in U.S. Pat. No. 6,523,651, assigned to the assignee of the present invention, wherein the rotor portion is cast about the hub portion as by insert casting to thereby axially and circumferentially mechanically interlock the rotor portion about the hub portion.

In accordance with yet another aspect of the invention, and referring again to FIG. 1, upon removal of the hub 52 from the casting mold and after the austempering the hub's center portion 56, a first machining stage cuts the hub's polygonal central bore 58 and then cuts the center portion's inboard face 62 square to the polygonal central bore 58. The hub's center portion 56 is then fixtured with reference to the finished inboard face 62 and central bore 58, and the inboard and outboard friction surfaces 82 of the hub's rotor portion 76 are straddle-cut to thereby achieve a high degree of parallelism between the hub's inboard face 62 and the friction surfaces 82 of the hub's rotor portion 76. The hub's wheel-mounting face 68 is also finished, in parallel to the hub's inboard face 62.

Once the wheel hub 52 is mounted on the shaft 36, and with the nut 66 tightened to preload the bearing assembly 20 and to bias the inboard face 62 of the hub's center portion 56 against the outboard face 64 of the bearing assembly's outboard inner race 34, the high degree of parallelism between these surfaces with the hub's wheel-mounting face 68 and the rotor portion's friction surfaces 82 provides the exemplary wheelend assembly 12 with a significantly reduced runout for both a mounted wheel and the rotor portion 76 of the hub 52. The reduced runout, in turn, advantageously improves wheelend runout and corner module service life, while further reducing corner module NVH levels.

While the above description constitutes the preferred embodiment, it will be appreciated that the invention is susceptible to modification, variation and change without departing from the proper scope and fair meaning of the subjoined claims. For example, while the exemplary wheelend assembly is described above in connection with a non-driven front-end corner module, it will be appreciated that the invention is equally applicable to non-driven rear-end corner modules. The invention is further applicable to continuously-driven and selectively-driven front-end and rear-end corner modules, for example, by forming a suitable power-transmitting couple on the inboard end of the stub shaft. Thus, depending upon the location and purpose of the corner module incorporating the exemplary wheelend assembly, the invention contemplates use of a recess or ball cup defined in the inboard end of the shaft, thereby forming a portion of a universal or constant velocity joint by which to "drive" the wheelend assembly with a mating driving shaft.

Also by way of example only, it will be appreciated that the invention contemplates a non-driven wheelend assembly whose stub shaft extends in the opposite direction, such that the preformed radial flange directly abuts the outboard face of the integrated hub-rotor, and the axial preload is applied via a nut threaded on the inboard end of the shaft, consistent with the approach of a so-called "Gen II.5" prior art design.

What is claimed is:

1. A wheelend assembly for a corner module of a motor vehicle, wherein the corner module includes a knuckle having a bore adapted to receive and support the wheelend assembly, the wheelend assembly comprising:

a shaft having an inboard end, an outboard end, and a longitudinal axis, wherein the shaft includes a contoured peripheral surface portion proximate to the outboard end, the contoured surface portion including at least three crests when viewed in lateral cross-section, each crest having a maximum crest diameter that remains substantially constant over a first length of the shaft;

a bearing assembly supporting the shaft for rotation in the bore of the knuckle, the bearing assembly including at least one inner race having a bearing face generally normal to the longitudinal axis of the shaft; and a hub mounted on the shaft proximate to the outboard end, wherein the hub includes an outboard wheel-mounting face and an inboard face, the inboard face of the hub directly abutting the bearing face, and wherein the hub includes a central portion with a central bore adapted to matingly receive the contoured peripheral surface portion of the shaft such that the hub rotates with the shaft, the central bore engaging the contoured peripheral surface portion of the shaft along a second length of the shaft within the first length.

2. The wheelend assembly of claim 1, wherein the second length is no greater than about 60% of the maximum crest diameter.

3. The wheelend assembly of claim 1, wherein the second length is no greater than about 50% of the maximum crest diameter.

4. The wheelend assembly of claim 1, wherein the second length is no greater than about 45% of the maximum crest diameter.

5. The wheelend assembly of claim 2, wherein each crest includes a circumferential jog along a third length of the shaft within the second length.

6. The wheelend assembly of claim 5, wherein the third length is no greater than about 30% of the second length.

7. The wheelend assembly of claim 5, wherein a portion of the crest along the third length of the shaft defines a line disposed at a predetermined angle with respect to a plane intersecting the longitudinal axis of the shaft.

8. The wheelend assembly of claim 7, wherein the predetermined angle is no greater than about 0.6°.

9. A wheelend assembly for a corner module of a motor vehicle, wherein the corner module includes a knuckle having a bore adapted to receive and support the wheelend assembly, the wheelend assembly comprising:

a shaft having an inboard end, an outboard end, and a longitudinal axis, wherein one of the inboard end and the outboard end includes a radial flange, and wherein the shaft further includes a contoured peripheral surface portion proximate to the outboard end, the contoured surface portion including at least three crests when viewed in lateral cross-section, each crest having a maximum crest diameter that remains substantially constant over a first length of the shaft;

a bearing assembly supporting the shaft for rotation in the bore of the knuckle, the bearing assembly including a pair of inner races respectively defining a bearing face generally normal to the longitudinal axis of the shaft, one bearing face abutting the radial flange of the shaft; and a hub mounted on the shaft proximate to the outboard end, wherein the hub includes an outboard wheel-mounting face and an inboard face, the inboard face of the hub directly abutting the other bearing face, and wherein the hub includes a central portion with a central bore adapted to matingly receive the contoured peripheral surface portion of the shaft such that the hub rotates with the shaft; and a threaded fastener engaging one of the inboard end and the outboard end of the shaft, the fastener axially biasing the hub towards the radial flange, wherein the central bore of the hub engages the contoured peripheral surface portion of the shaft along a second length of the shaft within the first length, and wherein each crest of the contoured peripherel surface portion of the shaft includes a circumferential jog along a third length of the shaft within the second length, the third length being no greater than about 30% of the second length.

10. The wheelend assembly of claim 9, wherein the second length is no greater than about 60% of the maximum crest diameter.

11. The wheelend assembly of claim 9, wherein the second length is no greater than about 50% of the maximum crest diameter.

12. The wheelend assembly of claim 9, wherein the second length is no greater than about 45% of the maximum crest diameter.

13. The wheelend assembly of claim 10, wherein the crest along the third length of the shaft defines a line disposed at a predetermined angle with respect to a plane intersecting the longitudinal axis of the shaft.

14. The wheelend assembly of claim 13, wherein the predetermined angle is no greater than about 0.6°.

* * * * *

UNITED STATES PATENT AND TRADEMARK OFFICE
CERTIFICATE OF CORRECTION

PATENT NO. : 6,869,151 B2
DATED : March 22, 2005
INVENTOR(S) : Douglas C. Myers et al.

It is certified that error appears in the above-identified patent and that said Letters Patent is hereby corrected as shown below:

<u>Title page,</u>
Item [56], References Cited, U.S. PATENT DOCUMENTS, insert the following
-- 6,450,585    9/2002    Kochsick --.

Signed and Sealed this

Fourth Day of October, 2005

JON W. DUDAS
*Director of the United States Patent and Trademark Office*